(No Model.)
G. PICKHARDT.
FORK.
No. 298,232. Patented May 6, 1884.
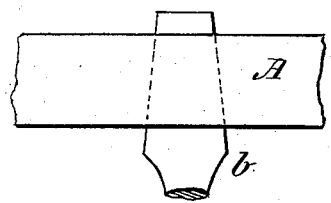
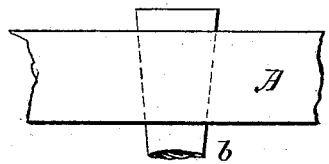
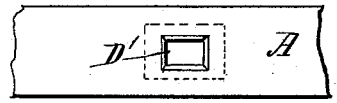
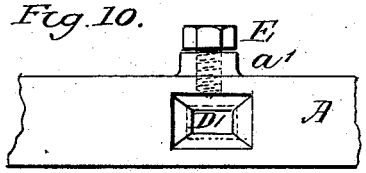
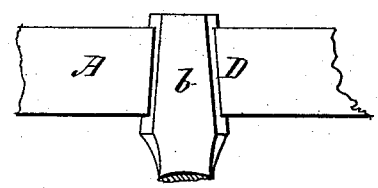
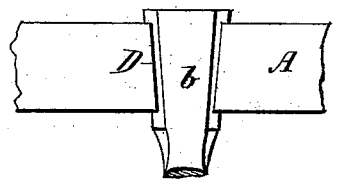
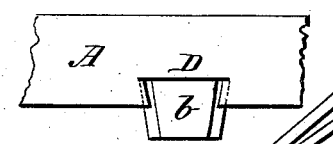
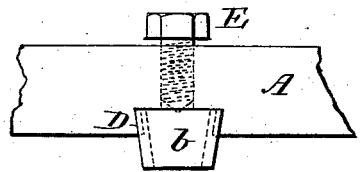
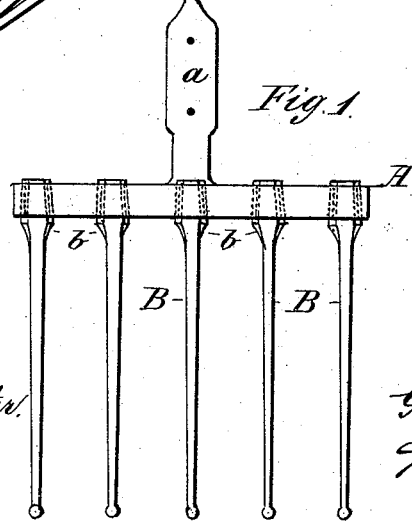
Witnesses
William E. Boulter
G.W. Knotts
Inventor
Gustav Pickhardt
pr Henry Orth
his atty

UNITED STATES PATENT OFFICE.

GUSTAV PICKHARDT, OF HAGEN, WESTPHALIA, GERMANY.

FORK.

SPECIFICATION forming part of Letters Patent No. 298,232, dated May 6, 1884.

Application filed May 8, 1883. (No model.)

*To all whom it may concern:*

Be it known that I, GUSTAV PICKHARDT, a subject of the King of Prussia, residing at Hagen, Westphalia, German Empire, have invented certain new and useful Improvements in Forks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in the construction of hay, manure, or other like forks; and it has for its object to provide means whereby the tines may be readily removed from the head of the fork when worn, and new ones inserted. Notwithstanding the fact that many attempts have been made to effect this object, so far as I know, no practical means have been provided, for the reason that those heretofore devised are either too complicated or of such construction that the tines will work loose after a very short time.

In the accompanying drawings, Figure 1 is a front elevation, Fig. 2 a section on line $x\,x$ of Fig. 1, of a fork constructed according to my invention. Figs. 3, 4, 5, 6, 7, 8, 9, and 10 show, on an enlarged scale, slight modifications in the means for securing the tines to the head of the fork.

Like letters of reference indicate like parts in the above figures of drawings.

A is the head of the fork, on which is formed, or to which is secured, a tang, $a$, for the attachment of the handle. The head A may be cylindrical, square, or of other rectangular form in cross-section, or it may be rectangular in cross-section, with the corners beveled or rounded, and may be made of any suitable material, such as iron or steel.

In order to provide a convenient means for attaching the tines B to the head A, so that they may be readily removed, I connect them with said head by means of an interlocking tapering joint. This may be effected in various ways.

As shown in Figs. 1 and 2, the tine B has an enlarged shank, $b$, the lateral edges of which are beveled off, as shown, and made tapering from the tine outward, said shanks fitting into tapering dovetailed grooves D, formed in the head A, in the rear face thereof. In this manner the tines can be firmly secured to the head, and to prevent their accidentally dropping out they may be secured by striking the flat face of the tine a blow or two with a hammer, to slightly spread the same and wedge the shank firmly in the groove. The tine may be removed at any time by simply striking the projecting end with a hammer.

Although I prefer to form the groove in the rear face of the head A, because the tines will have a firmer bearing, and the upper face of said head will be free from obstructions formed by the projecting face of the tine-shanks, such grooves may be formed in the front face, or they may be formed in the upper or lower faces of said head A. In the latter arrangement the tines should of course be bent to bring them into proper position relatively to the head A.

The dovetailed grooves may be made to taper from the lower to the upper edge, or from front to rear, or vice versa, as shown in the drawings.

When the taper of the tine-shanks is in the direction of the tines, and such tines are to be inserted as shown in Figs. 5, 6, 9, and 10, means should be provided to secure them in the grooves D. This may be effected by a blow from a hammer, as above described, or by means of a set-screw, E, as shown in Figs. 6 and 10.

Instead of securing the tines in dovetailed tapering grooves, as above described, tapering dovetailed sockets D' or slots may be formed in the head A, as shown in Figs. 7, 8, 9, and 10; and when the tines are inserted from the rear or from the top of the head A, I preferably secure them in position by means of set-screws E, as above described, and as shown in Figs. 9 and 10.

When the tines are secured by means of set-screws, I preferably form bosses $a'$ on the fork-head, as shown in Fig. 10, to afford a better bearing for said set-screws.

Having described my invention, what I claim is—

1. In a fork, a head, A, having tapering grooves and a corresponding number of bosses, $a'$, in combination with tines having enlarged tapering shanks and set-screws arranged to work in said bosses, as described, for the purposes specified.

2. In a fork, a tine having an enlarged tapering shank, the lateral edges of which are beveled, in combination with a fork-head having dovetailed tapering grooves or slots for the reception of said tine-shank, substantially as shown and described.

3. In a fork, a tine having a tapering enlarged shank, the lateral edges of which are beveled, and a head, A, having a dovetailed groove or slot of the same taper as the tine-shank, in combination with a set-screw, substantially as shown and described.

In testimony whereof I affix my signature in presence of two witnesses.

GUSTAV PICKHARDT.

Witnesses:
   SAMUEL SPACKMAN,
   PH. PEITMAN.